Aug. 7, 1934.  E. C. FRITTS  1,969,458
APPARATUS FOR MOVING MOTION PICTURE FILM
Filed May 25, 1932
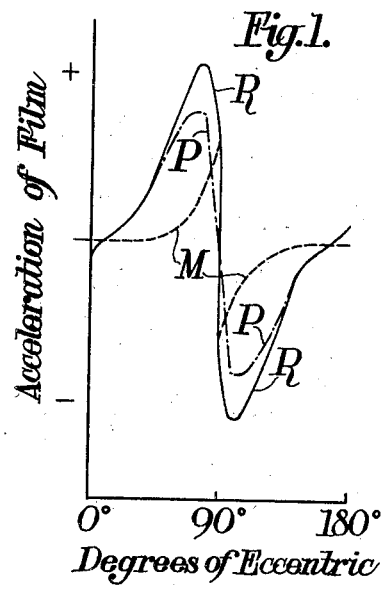
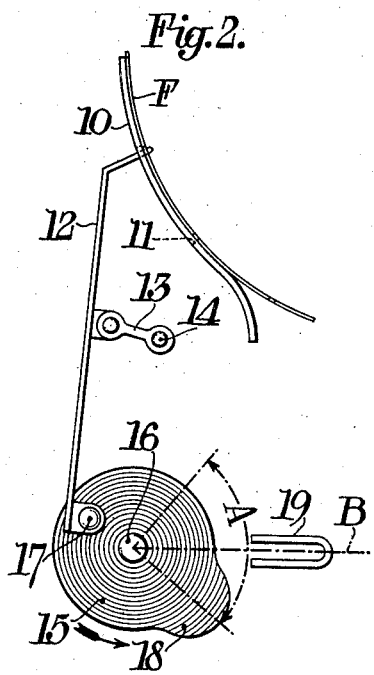
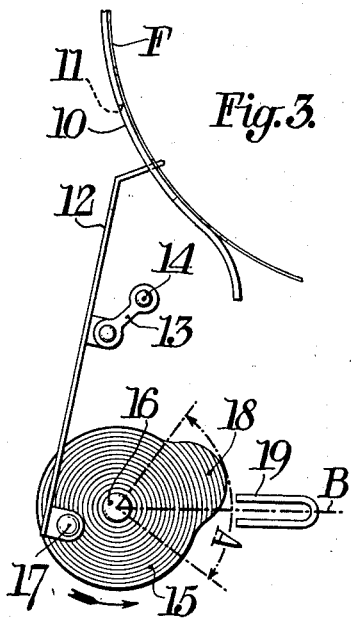
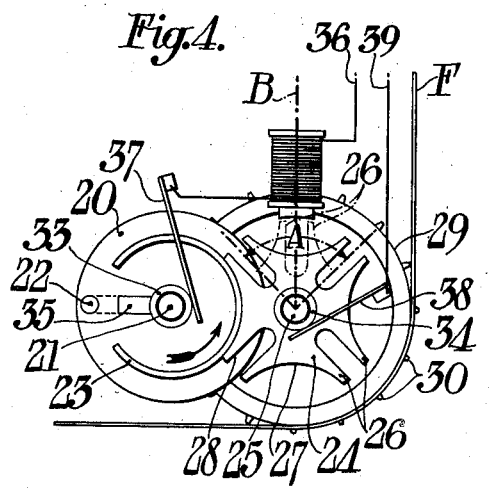
Inventor:
Edwin C. Fritts,
By Newton M. Perrins
George A. Gillette, Jr.
Attorneys Patented Aug. 7, 1934

1,969,458

UNITED STATES PATENT OFFICE

1,969,458

APPARATUS FOR MOVING MOTION PICTURE FILM

Edwin C. Fritts, Rochester, N. Y., assignor to Eastman Kodak Company, Rochester, N. Y., a corporation of New York Application May 25, 1932, Serial No. 613,541

12 Claims. (Cl. 88—18.4)

The present invention relates to an apparatus for advancing motion picture film and more particularly to the advancement of film by combined mechanical and magnetic energy.

Film advancing mechanisms which depend entirely on mechanical energy and mechanical movements for advancement of the film are disadvantageous in that they are inefficient and cause excessive wear on the mechanical parts. These difficulties cannot be readily overcome because the required intermittent movement of the film results in rapidly changing forces in the moving parts. On the other hand, film advancing mechanisms which are wholly magnetic have not been satisfactory because of their complexity and the difficulty of obtaining steady pictures because of variations in the length of successive intermittent movements to advance the film.

The primary object of the present invention is to combine a mechanical movement and a magnetic force for film advancement which is accurate and which does not cause excessive wear on the mechanical elements.

Another object of the present invention is the combination of a mechanical film advancing movement and a magnetic means so that the magnetic means is exerting its maximum attraction at the instant when the mechanical means is changing its acceleration of the film from a positive acceleration to a negative acceleration.

A further object of the present invention is the provision of a claw type of intermittent film advancing mechanism which is actuated by an eccentric carrying a projection, and the provision of magnetic means which attracts said projection and accelerates the eccentric in the same direction and at the same time as the claw accelerates the film.

A still further object of the present invention is the provision of a Geneva type of film advancing mechanism in combination with a magnetic means which acts upon the teeth of the Geneva movement to assist in accelerating the starwheel in synchronism and in the same direction as the mechanical acceleration of the starwheel.

A still further object of the present invention is the provision of a Geneva movement for film advancement in combination with an electromagnet which is intermittently energized to attract the teeth of the starwheel only during movement thereof.

Other objects of the invention will be suggested to those skilled in the art as the description of my invention is developed hereinafter.

The aforementioned and other objects of the invention are embodied in an apparatus for advancing film which comprises a mechanical means for intermittently moving a film, first with positive acceleration and then with negative acceleration, in combination with a magnetic means which attracts a projection on the mechanical means and which imparts positive and negative acceleration to the film in synchronism with the accelerations of the mechanical movement.

Reference is hereby made to the accompanying drawing in which similar reference numerals designate similar elements and in which:

Fig. 1 is a graphical illustration of the manner in which the mechanical and magnetic forces are combined to give the desired advancing movement to the film according to the invention.

Fig. 2 is a side view of a claw type mechanical advancing mechanism in combination with a magnetic means.

Fig. 3 is also a side elevation of the claw type mechanical movement shown in Fig. 2 but which illustrates the claw in a position during which it is receiving negative acceleration both from the mechanical linkages and the magnetic means.

Fig. 4 is a side elevation of a Geneva movement for mechanically advancing film in combination with an electromagnet which is adapted to be intermittently energized in synchronism with the movement of the Geneva starwheel.

The usual film advancing mechanism is actuated by a prime mover, either manually or by an electric or spring motor, and because of the rapid intermittent motion which must be imparted to the film, this prime mover and the intermediate mechanical parts are placed under rapidly varying stresses and of themselves possess considerable mechanical inertia, both of which result in excessive wear on these parts and considerably shorten their term of usefulness.

In order to advance the film the required distance, in the short time available, the engaging means in contact with the film perforations must first be given a positive acceleration which increases quite rapidly and then after the film has been moved about half of the required distance the engaging means must be given a rapidly increasing negative acceleration so that the film will be brought to a complete stop within the required time. The variation of this acceleration is illustrated by the dash-dot curve P of Fig. 1, the abscissa of this curve being degrees of rotation of the eccentric means and the ordinates of the curve being acceleration of the film, both positive and negative. It will be noted that this curve changes from the maximum positive acceleration to the maximum negative acceleration within a few degrees rotation of the eccentric means, thus indicating quite clearly the tremendous forces which must be created within the small, rapidly moving parts of the advancing mechanism.

If the film acceleration is to be increased by mechanical means, the various objectionable forces in the parts are more than proportionally increased. According to the invention such increased acceleration may be readily obtained by providing a projection on the eccentric means and by properly locating a magnetic means to attract the projection to impart positive acceleration to the film movement and after the projection has passed the magnetic means to still attract the projection but then to impart negative acceleration to the film movement. The change from positive to negative acceleration by this magnetic means does not require the dissipation of any mechanical inertia. The curve M of Fig. 1 illustrates the acceleration of the film caused directly by the action of the magnetic means upon the projection of the eccentric means. The curve R represents the graphical sum of curves P and M and indicates that, by combining the mechanical and magnetic forces for accelerating the film, a more rapidly varying acceleration can be obtained without increasing the mechanical stresses within the mechanical elements of the film advancing mechanism.

This problem may also be approached in the reverse order. If the acceleration required for the intermittent movement of the film is known, then a magnetic means of particular characteristics can be selected and plotted as illustrated by the line M on Fig. 1. Then the acceleration of the magnetic means may be subtracted from the required acceleration illustrated by the line R and the result will show the acceleration characteristics for the purely mechanical movement which will advance the film as required. It is quite obvious that the design of such mechanical movement will be greatly simplified because of the smaller mechanical inertia to be overcome as compared to the inertia in a mechanical movement to give the required acceleration curve.

In the illustrated embodiment of the invention, the combination of a magnetic means with two different types of mechanical film advancing mechanisms has been shown. Figs. 2 and 3 illustrate a claw type mechanical advancing mechanism in combination with a permanent magnet while Fig. 4 illustrates a Geneva type of film advancing mechanism in combination with an electro-magnet.

Referring now to Figs. 2 and 3, the film F is guided in a known manner by a gate member 10 provided with a slot 11 for entry of the engaging means to engage the perforations of the film. A claw 12 has a toothed end as the specific engaging means for entering slot 11 to engage the film perforations and is intermediately pivoted to a link 13 which in turn pivots about the stud 14 on the camera or frame of the apparatus to which the film advancing mechanism is attached. A disk 15 rotates with a shaft 16 which is driven in a known manner either manually or by an electric or spring motor. One end of claw 12 is pivoted on and driven by a pin 17 eccentrically located upon the disk 15. The claw type film advancing mechanism as thus far described is well known in the art.

A projection 18 is provided upon the eccentric means or disk 15. A permanent magnet 19 is located so as to exert a force of magnetic attraction upon said projection 18. The disk 15 is effective only during part of a revolution to advance the film and it is during this part of a revolution that the positive and negative acceleration of the film must take place. The angle of the effective rotatable movement is equal to or less than 180° depending upon the design of the advancing mechanism and has been indicated in the illustrated embodiment by the angle A. During the movement of projection 18 from the position shown in Fig. 2 to the position of maximum attraction by the magnet 19, the toothed end of the claw 12 has received a positive acceleration by virtue of the mechanical linkages. The magnet 19 has also been operative during this period to attract the projection 18 and to augment the positive acceleration of the toothed end of claw 12. As the projection 18 moves past the center line of magnet 19 then the attractive force of the magnet is acting in opposition to the prime mover. The disk 15 is negatively accelerated by magnet 19, the relation of the parts under such conditions being shown in Fig. 3 and the characteristics of the accelerations being indicated by the lower half of the curve of Fig. 1. The magnet 19 is located with its center line coinciding with the bisector B of the effective angle A of the eccentric means of disk 15 of the film advancing mechanism. This location of magnet 19 insures that the maximum magnetic attraction on projection 18 will be exercised at the moment when the mechanical acceleration of the toothed end of claw 12 is being changed from a positive acceleration to a negative acceleration.

The invention is also applicable to a Geneva movement for intermittently advancing a film F. This adaptation is shown in Fig. 4. The eccentric means of the Geneva movement includes a disk 20 mounted upon a shaft 21 which is rotated by a suitable prime mover in a known manner. A pin 22 is eccentrically located on disk 20 and the circular shoe 23 is concentrically mounted on disk 20. The Geneva movement also includes a starwheel 24 mounted upon a shaft 25 having pairs of teeth 26 and provided with cam surfaces 27 and notches 28. A sprocket wheel 29 is mounted upon shaft 25 and has a plurality of sprocket teeth 30 engaging the perforations of film F. Continuous rotation of shaft 21 will result in intermittent movement of starwheel 24 and sprocket wheel 29 in a known manner, the effective angle of starwheel 24 for each intermittent movement being indicated by the angle A.

The magnetic means in this embodiment is located with its axis on the bisector B of the angle A and specifically comprises an electromagnet 31 having a core 32 which is nearest to one pair of starwheel teeth 26 when the starwheel 24 has moved through only half of its effective angle A. Thus it will be seen that the pairs of teeth 26 of starwheel 24 function in the same manner as the projection 18 on disk 15 of the modification illustrated in Figs. 2 and 3, as well as performing the usual function in the Geneva movement. The position of a pair of starwheel teeth 26 during maximum magnetic attraction under the action of electromagnet 31 is indicated by dotted lines in Fig. 4.

In order to conserve electrical energy, when operating with an electromagnet, the Geneva movement may also be utilized as a switch so that the electromagnet 31 will be energized only during movement of starwheel 24. The disk 20 or circular shoe 23 may be composed of insulating material so that there will be no normal electrical connection between the two elements of the Geneva movement. A slip ring 33 is mounted upon but insulated from shaft 21 and another slip ring 34 is mounted upon but insulated from shaft 25. The slip ring 33 is connected by a conductor 35, such as copper ribbon, to the pin 22 which is eccentrically mounted on disk 20. One side of electromagnet 31 is connected to a source of electric energy by a wire 36. The other side of magnet 31 is connected to a brush 37 making contact with slip ring 33. The slip ring 34 is connected through a second brush 38 and a wire 39 to the other side of the source of electrical energy. The electromagnet 31 is de-energized when pin 22 is out of engagement with the starwheel 24. One such position of the elements of the Geneva movement is shown in Fig. 4. When pin 22 has moved in the direction of the arrow to enter one of the notches 28 and to abut one of the teeth 26, then electromagnet 31 is energized through wire 36, brush 37, slip ring 33, conductor 35, pin 22, starwheel 24, slip ring 34, brush 38 and wire 39. As soon as the pin 22 leaves the starwheel 24 then this circuit is again broken and electromagnet 31 is de-energized.

It is within the scope of the present invention to provide a magnetic means in combination with any type of mechanical film advancing mechanism to impart positive and negative acceleration to the film and to correspondingly decrease the acceleration and change of acceleration which must be furnished by such a mechanical movement. The application of the invention with respect to a skip stroke type of film advancing mechanism has not been disclosed but should be obvious to one skilled in the art since the projection and magnet of the invention would be located on and adjacent to the shaft which makes a single revolution for each cycle. Many other modifications will also be obvious to those skilled in the art and therefore the present disclosure is to be construed as illustrative and not in a limiting sense.

Having now particularly described my invention what I desire to secure by Letters Patent of the United States and what I claim is:

1. In a film moving mechanism, the combination with an engaging means adapted to engage and move a film, an eccentric means for moving and accelerating said engaging means and a projection connected to rotate with said eccentric means, of a magnetic means adapted to attract said projection and to accelerate said engaging means.

2. In a film moving mechanism, the combination with an engaging means adapted to engage and move a film, an eccentric means for moving said engaging means and imparting a positive and negative acceleration thereto, and a projection connected to rotate with said eccentric means, of a magnetic means adapted to attract said projection and to impart a positive and negative acceleration to said engaging means.

3. In a film moving mechanism, the combination with an engaging means adapted to engage and move a film, an eccentric means for moving said engaging means and imparting a positive and negative acceleration thereto, and a projection connected to rotate with said eccentric means of a magnetic means adapted to attract said projection and to impart a positive and negative acceleration to said engaging means and located to exert the maximum attraction for said projection during the change from positive to negative acceleration of said engaging means.

4. In a film moving mechanism, the combination with an engaging means adapted to engage a film and intermittently to move the same a predetermined distance, an eccentric means for moving said engaging means and imparting an acceleration to said engaging means which changes from positive to negative acceleration during movement of the film and a projection connected to rotate with said eccentric means, of a magnetic means adapted to exert an increasing and decreasing attraction on said projection and located to exert the maximum attraction for said projection when the positive acceleration of said engaging means is changing to negative acceleration.

5. In a film moving mechanism, the combination with an engaging means adapted to engage and intermittently to move a film, an eccentric means rotatable through a predetermined angle and effective to move the film a predetermined distance and a projection connected to rotate with said eccentric means, of a magnetic means adapted to attract said projection and located upon an axis which bisects said predetermined angle.

6. In a film moving mechanism, the combination with a claw adapted intermittently to engage and move a film, an eccentric actuating one end of said claw and imparting a positive and negative acceleration to the other end of said claw during engagement with the film, and a projection on said eccentric, of a magnet adapted to attract said projection and located to exert the maximum attraction thereon during the change from positive to negative acceleration of said other end of the claw.

7. In a film moving mechanism, the combination with a rotating disc, a claw eccentrically pivoted at one end to said disc, a link intermediately pivoted to said claw, the other end of said claw being adapted intermittently to engage and move a film through a predetermined distance, and an arcuate projection on a periphery of said disc, of a permanent magnet located to exert the maximum attraction for said projection in the middle of the movement of the film through said predetermined distance.

8. In a film moving mechanism, the combination with an engaging means for engaging and intermittently moving a film, a Geneva movement including a starwheel intermittently rotated through a predetermined angle and actuating said engaging means, of a magnetic means adapted to attract said starwheel and located at the center of an arc subtending said predetermined angle.

9. In a film moving mechanism, the combination with an engaging means for engaging and intermittently moving a film, a Geneva movement including a starwheel having a plurality of pairs of teeth, intermittently rotated through a predetermined angle and actuating said engaging means, of a magnet adapted to attract the pairs of teeth on said starwheel and located on an axis bisecting the predetermined angle through which the pairs of teeth are intermittently rotated.

10. In a film moving mechanism, the combination with a Geneva movement including a disc having a pin eccentrically located thereon and including a starwheel having a plurality of pairs of teeth and being intermittently rotated by said pin through a predetermined angle, and an engaging means actuated by said starwheel and engaging and intermittently moving a film, of an electro-magnet adapted to attract pairs of teeth and located upon an axis which bisects the predetermined angle through which the teeth are rotated.

11. In a film moving mechanism, the combination with a Geneva movement including a disc having a pin eccentrically located thereon and including a starwheel having a plurality of pairs of teeth and being intermittently rotated by said pin through a predetermined angle, and an engaging means actuated by said starwheel and engaging and intermittently moving a film, of an electro-magnet adapted to attract said pairs of teeth, located upon an axis which bisects said predetermined angle and adapted to be energized only during the movement of said starwheel.

12. In a film moving mechanism, the combination with a Geneva movement including a disc having a pin eccentrically located thereon and including a starwheel having a plurality of pairs of teeth and being intermittently rotated by said pin through a predetermined angle, and an engaging means actuated by said starwheel and engaging and intermittently moving a film, of an electro-magnet adapted to attract said pairs of teeth, adapted to be connected to a source of electrical energy by and during engagement between said pin and said starwheel, and located upon an axis which bisects said predetermined angle.

EDWIN C. FRITTS.